June 20, 1967 R. J. GRAVES 3,326,441
PNEUMATIC MOVIE FILM ADVANCE SYSTEM
Filed July 26, 1965 2 Sheets-Sheet 1
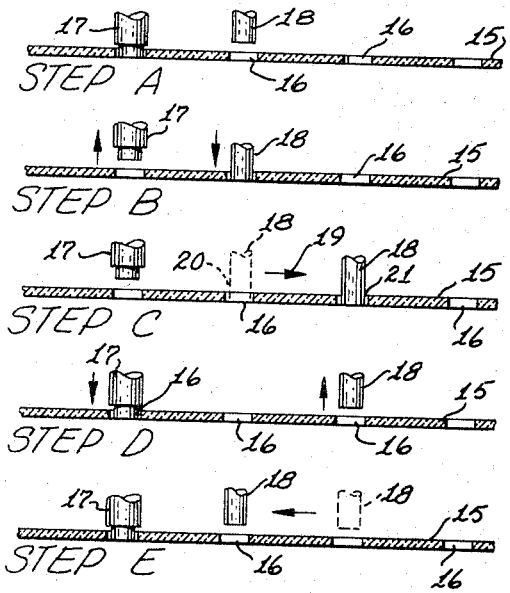
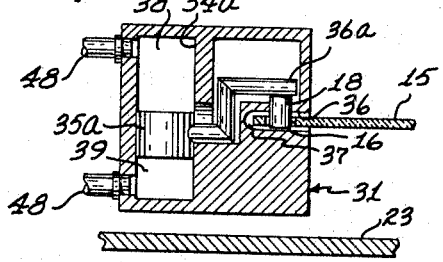
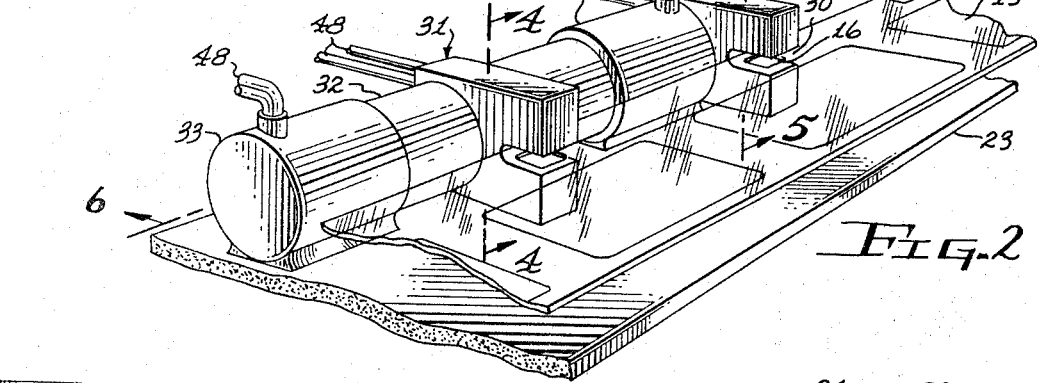
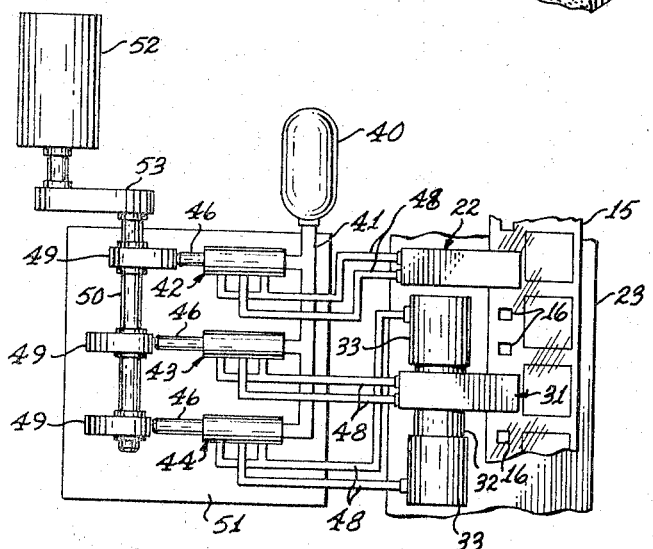
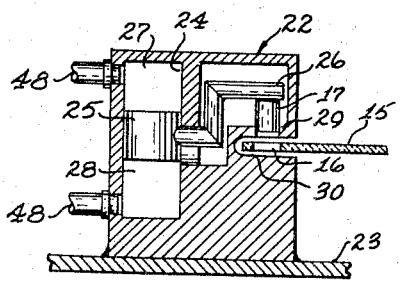
INVENTOR.
RODNEY J. GRAVES
BY
Willard S. Grout
ATTORNEY June 20, 1967  R. J. GRAVES  3,326,441
PNEUMATIC MOVIE FILM ADVANCE SYSTEM
Filed July 26, 1965  2 Sheets-Sheet 2
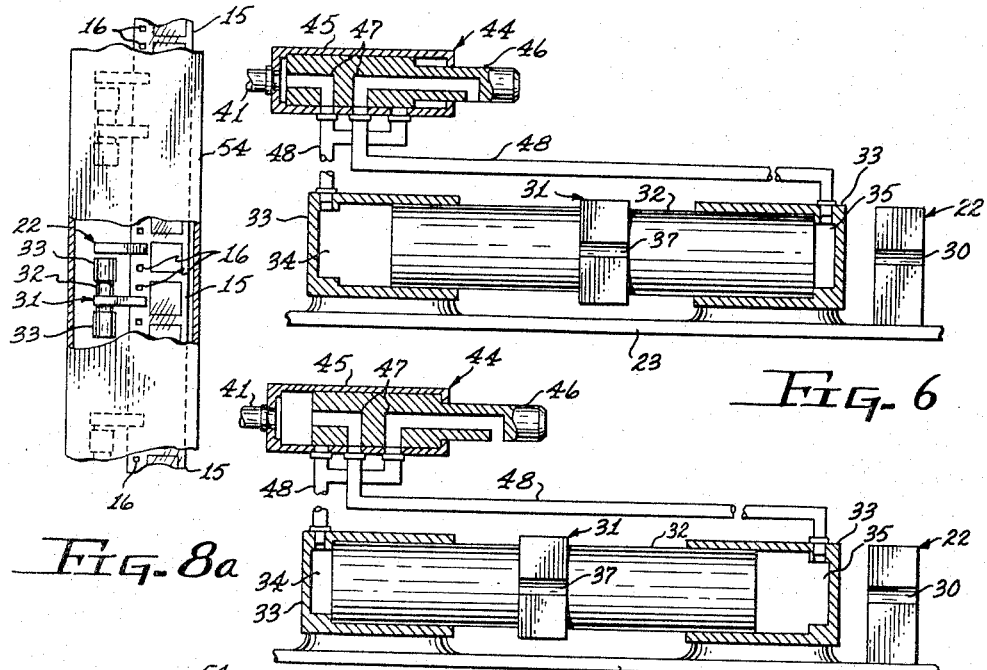
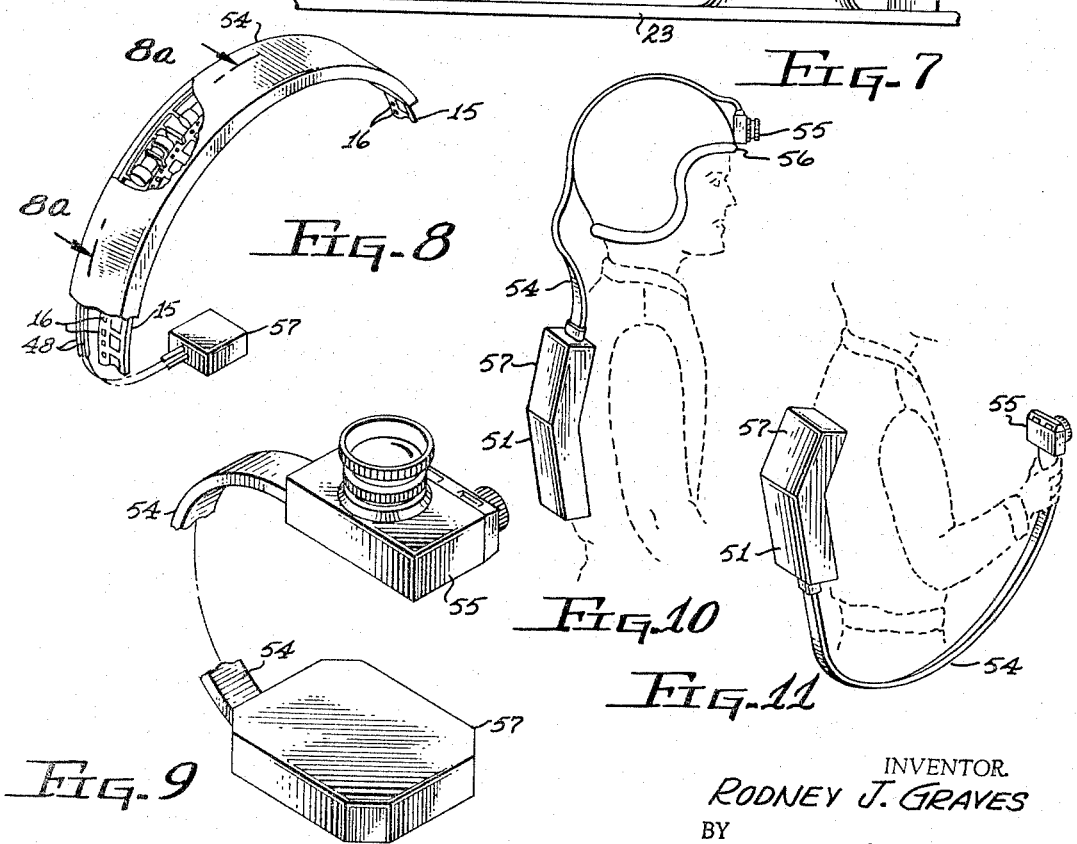
INVENTOR.
RODNEY J. GRAVES
BY
Willard S. Grow
ATTORNEY United States Patent Office 3,326,441
Patented June 20, 1967

3,326,441
PNEUMATIC MOVIE FILM ADVANCE SYSTEM
Rodney Jackson Graves, 2629 Portland St.,
Los Angeles, Calif. 90007
Filed July 26, 1965, Ser. No. 474,850
3 Claims. (Cl. 226—67)

ABSTRACT OF THE DISCLOSURE

A fluid pressure actuated film advance apparatus especially adapted to deliver film from a remote film magazine to a movable camera lens shutter unit.

---

This invention is directed to a movie film advance system and is more particularly directed to a fluid pressure actuated intermittent film advance system and apparatus.

Present day film advance systems use standard pin and claw movements, which are driven by the rotary motion of electric motors. The principle of motion pictures is found in intermittent movement. Therefore, revolving motion must be transformed to intermittent motion. This practice involves machinery of considerable size, weight and complexity.

One of the objects of this invention is in motion picture equipment utilizing a film advance system in which the origin of motion is intermittent itself so that it will find a wider range of capabilities and applications due to the reduction of size, weight and rigidity.

Another object is to design a fluid or pneumatic pressure motivated film advance system, the thrust of which is used to activate the registration and claw pins and also to travel the film forward.

A further object is to provide a single pneumatically operated advance unit which has the advantage of being compact and light so that the units may be set in a series with hinged connections to make a flexible chain and thus a flexible film transport since the units are driven pneumatically and may be maintained in synchronized phase relationship by common connections with a main source of power.

And it is a further object in a pneumatic movie film advance system to provide the magazine holding the film independent of the gate and lens component, the magazine being carried on a man's back while the lens and gate may be mounted on a helmet or held like a gun in one hand.

Further features and advantages of this invention will appear from a detailed description of the drawings in which:

FIG. 1 is a diagram showing the claw and pin elements for intermittently advancing the movie film.

FIG. 2 is a perspective view of one self-contained pneumatic film advance unit incorporating the features of this invention.

FIG. 3 is a control circuit diagram for the apparatus shown in FIG. 2.

FIG. 4 is an enlarged sectional view on the line 4—4 of FIG. 2.

FIG. 5 is an enlarged sectional view on the line 5—5 of FIG. 2.

FIG. 6 is an enlarged sectional view on the line 6—6 of FIG. 2.

FIG. 7 is a sectional view similar to FIG. 6 with the parts in reversed position.

FIG. 8 is a perspective view of the flexible film transport unit.

FIG. 8a is an enlarged broken away fragmentary sectional view on the line 8a—8a of FIG. 8.

FIG. 9 is an enlarged fragmentary perspective view of a portable camera arrangement.

FIG. 10 is a side view of the apparatus of FIG. 9 being worn by a person with the camera on his head.

FIG. 11 is still another view showing the camera of FIG. 10 arranged for hand holding.

Motion picture film 15 is designed with a series of sprocket holes 16 spaced at even intervals either on one or both sides of the strip, the purpose being to secure exact travel distances frame to frame and also to stabilize the film 15 during the time of projection or exposure.

Machinery in use today for taking or showing motion pictures is designed to perform the two functions mentioned above with speed and accuracy. The mechanical pattern of movement is essentially uniform, although there exist many variations in the design of the equipment now in use. The primary function of any such machinery is to advance the film one frame and hold it in a still position during projection or exposure. This is the cycle which must be executed twenty-four times each second to create the illusion of normal movement.

The above basic movement cycle is illustrated in FIG. 1 as characteristic of all present motion picture devices in which there is shown the registration pin 17 and the advancing claw 18. The cycle of operation is shown by reference to steps A to E of FIG. 1.

In step A both the pin 17 and claw 18 are at rest.

In step B the pin 17 retracts from the film sprocket hole 16 and the claw moves into a sprocket hole.

In step C the pin 17 remains retracted as the claw 18 moves to advance the film to the next frame as indicated by arrow 19, moving from the broken line position 20 to the full line position 21.

In step D the pin 17 inserts in the next sprocket hole 16 and the claw 18 withdraws from the film sprocket hole.

Finally, in step E the registration pin 17 remains inserted in the film and the claw 18 retracts back to the position shown in A to complete the cycle.

In FIGS. 2 and 3 is shown an arrangement wherein the above described sequence of operation of the registration pin 17 and film advance claw 18 by fluid pressure actuated devices.

To this end there is provided one or more registration pin actuating units 22, FIG. 5, suitably fixed to the main frame 23 of a movie camera, projector or the like, each of which contains a cylinder bore 24 having a piston 25 to which is fixed the actuating arm 26 carrying the registration pin 17.

Applying fluid pressure, such as compressed air, in cylinder chamber 27 inserts the registration pin 17 into a sprocket hole 16 while applying fluid pressure in chamber 28 causes withdrawal of the registration pin from the sprocket hole. A suitable backup guide plate 29 is provided to form a guide slot 30 through which the film 15 is guided.

One or more claw units 31 are fixed on a claw carriage piston 32 suitably reciprocatably mounted in cylinders 33 fixed on the main frame 23, the carriage piston 32 being actuated by applying fluid pressure in the cylinder chambers 34 and 35, so that the claw units may be reciprocated longitudinally in film advance direction of the film 15 to advance the film frame-by-frame.

Each of the claw units 31, FIG. 4, include a cylinder bore 34a having a piston 35a to which is fixed the arm 36a fixed to the film advance claw 18. A suitable backup guide plate 36 is formed on the claw unit 31 to form a slot 37 through which the film 15 is advanced. When fluid pressure is applied in cylinder chamber 38 claw 18 is inserted into a film sprocket hole 16, the claw 18 being withdrawn when fluid pressure is applied in cylinder chamber 39.

In FIG. 3 is shown a piping diagram and control apparatus suitable for operating the pneumatically operated pin and claw devices in the proper cycle of operation. A source of air pressure from a pressure tank 40 is connected to pressure supply line 41 connected to a series of reversing control valves 42, 43 and 44 for the registration pin unit 22, claw unit 31 and claw reciprocating piston 32, respectively. Each of the reversing control valves 42, 43 and 44 comprises a valve body 45 suitably fixed to the base 51 and a reciprocating plunger 46 therein having suitable parting and passageways 47 so as to alternately supply pressure and exhaust to the supply lines 48 for the respective cylinder chambers 27–28, 34–35, and 38–39 of the registration pin unit 22, claw unit 31, and claw reciprocating piston 32. A series of cams 49 are fixed on the cam shaft 50 journaled on the base 51 are arranged to engage and reciprocate the plungers 46 of the valves 42, 43 and 44 in the desired sequence for the movie film advance. A suitable drive motor 52 may be connected by a drive transmission 53 for rotating the cam shaft 50 at the required speed so as to operate the registration pin 17 and film advance claw 18 in the described manner of FIG. 1.

In FIG. 8a a whole series of film advance units such as shown in FIG. 2 may be mounted on a flexible support or hose 54 and pneumatically interconnected in parallel to the control valves 42, 43 and 44 so as to provide a highly flexible and universal film transport unit, such for example, as shown in FIG. 8. Such a structure particularly adapts itself to use of a camera lens shutter component 55 at a remote location on the forehead 56, FIG. 10, with the film magazines 57 and power unit and control 51 at a remote location on the photographers back. The flexible film transport hose may also be used with the camera component 55 in hand held arrangement as shown in FIG. 11.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A fluid pressure operated film advance unit comprising in combination:
    (A) a fluid pressure actuated claw movable to and from the film and longitudinally of the film,
    (B) a fluid pressure actuated registration pin movable to and from the film,
    (C) a remote fluid pressure source and control device connected to operate said claw and registration pin in a sequence of film advance,
    (D) and a flexible mounting unit adapted to support a series of said film advance units so as to provide a portable flexible film transport conduit to a camera lens shutter-gate component and the like at a location remote from said power and control device and film magazine.

2. A movie film advance system comprising in combination:
    (A) a frame,
    (B) a film advance cylinder fixed on said frame,
    (C) a claw carriage cylinder movably mounted in said film advance cylinder and connected to a source of fluid pressure to be reciprocated in the direction of film advance on said frame,
    (D) a claw unit mounted on said claw carriage cylinder including,
    (E) a claw unit cylinder,
    (F) a claw actuating piston in said claw unit cylinder,
    (G) and a film advance claw connected to said claw unit cylinder so that energizing said claw unit cylinder controls the insertion and retraction of the claw relative to the film,
    (H) a registration pin unit fixed on said frame including,
    (I) a registration pin cylinder having,
    (J) a registration pin piston in said cylinder,
    (K) and a film registration pin connected to said registration pin piston so that energizing said registration pin cylinder controls the insertion and retraction of the registration pin relative to said film,
    (L) and pneumatic mechanical control means connected to said cylinders to operate said pistons in a predetermined sequence of film advance movement.

3. A fluid pressure operated film advance unit comprising in combination:
    (A) a frame,
    (B) a fluid pressure actuated claw movable on said frame laterally to and from the film and longitudinally of the film,
    (C) a fluid pressure actuated registration pin limited to lateral movement on said frame relatively to and from the film,
    (D) and a remote source of fluid power and a control device connected to operate said claw and registration pin in a sequence of film advance.

References Cited

UNITED STATES PATENTS 3,279,666  10/1966  Graves _____ 226—158

FOREIGN PATENTS 513,536  2/1955  Italy.

M. HENSON WOOD, JR., *Primary Examiner.*

J. N. ERLICH, *Assistant Examiner.*